UNITED STATES PATENT OFFICE.

LEWIS HURD, OF KEWANEE, ILLINOIS.

IMPROVEMENT IN EDIBLE COMPOUNDS OR APPLE-HONEYS.

Specification forming part of Letters Patent No. 154,952, dated September 15, 1874; application filed July 22, 1874.

*To all whom it may concern:*

Be it known that I, LEWIS HURD, of Kewanee, county of Henry and State of Illinois, have invented certain Improvements in Edible Compounds called "Apple-Honey," of which the following is a specification:

This invention relates to a composition of matter intended more especially for table use, the preparation of which is as follows:

Take apple-cider, fresh from the press, and filter in any ordinary manner—preferably, however, through white flannel or dried honey-comb. After filtering, place it over a fire and raise the temperature to about 100° Fahrenheit; to every twelve pounds of the cider then add from eight to ten pounds of best quality of white sugar, and one-half of a lemon in slices; keep the temperature at about the above degree for the space of one hour, or until the ingredients are brought to the consistency of ordinary strained honey, and skim as required while it is simmering. Flavoring may now be added, if desired; but the flavor of the fruit used itself will generally be preferred. After it has been removed from the fire and cooled, it may be again strained through any ordinary fine strainer, or fine white cloth of any kind, to render it very clear, and free from all sediment.

Other fruit than apples may be used, and will impart, of course their particular flavor. The amount or proportion of sugar may also be varied as above, to regulate or control the tartness.

This composition will keep in the warmest weather without any difficulty or danger of deterioration, and in the coldest weather without danger of freezing, and will furnish an excellent and healthy article for table use, vehicle for the administration of medicines, &c.

I claim—

The edible liquid compound herein described, made by adding sugar and lemon to cider, in the proportions set forth, at a temperature of about 100° Fahrenheit, in the manner specified.

LEWIS HURD.

Witnesses:
J. J. TUNNICLIFF,
JNO. D. PATTEN.